Oct. 9, 1962 G. WIGGERMANN 3,057,193
HYDROSTATIC TORQUE-MEASURING APPARATUS
Filed Dec. 2, 1957 2 Sheets-Sheet 1
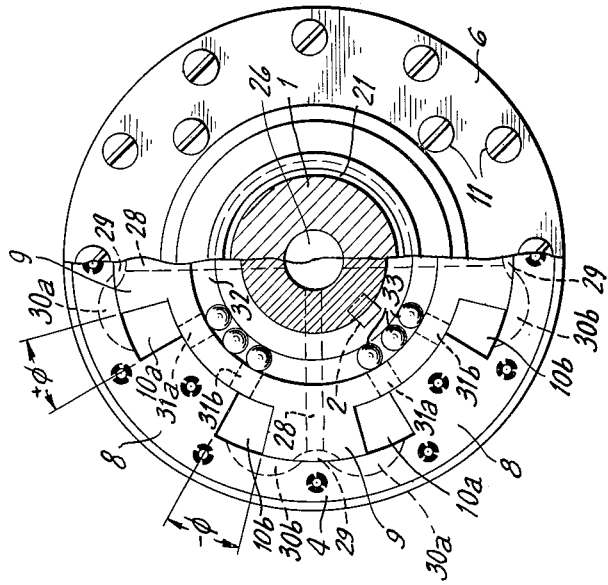
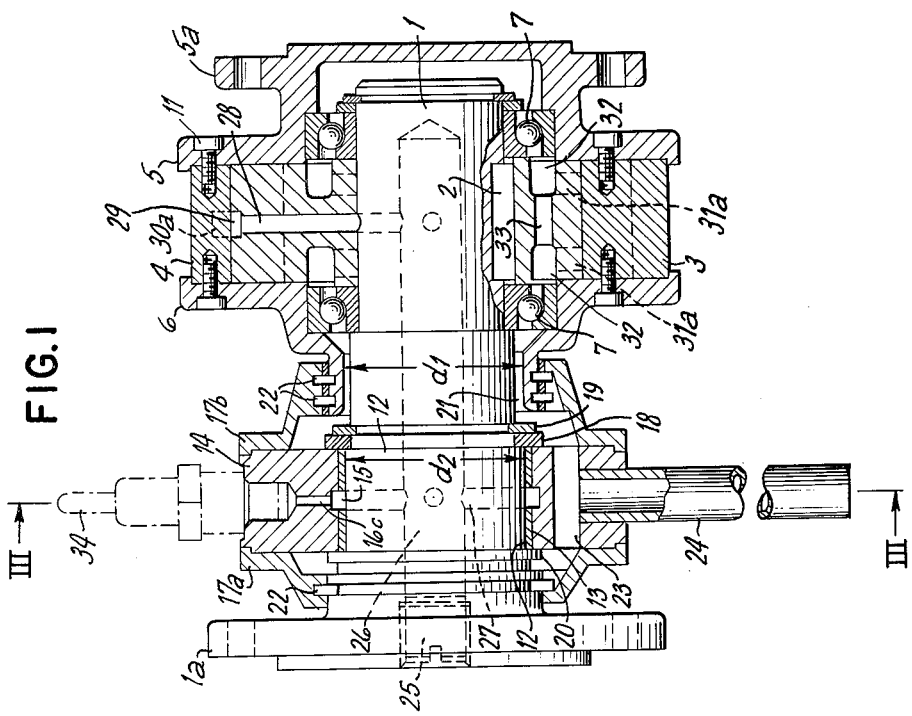

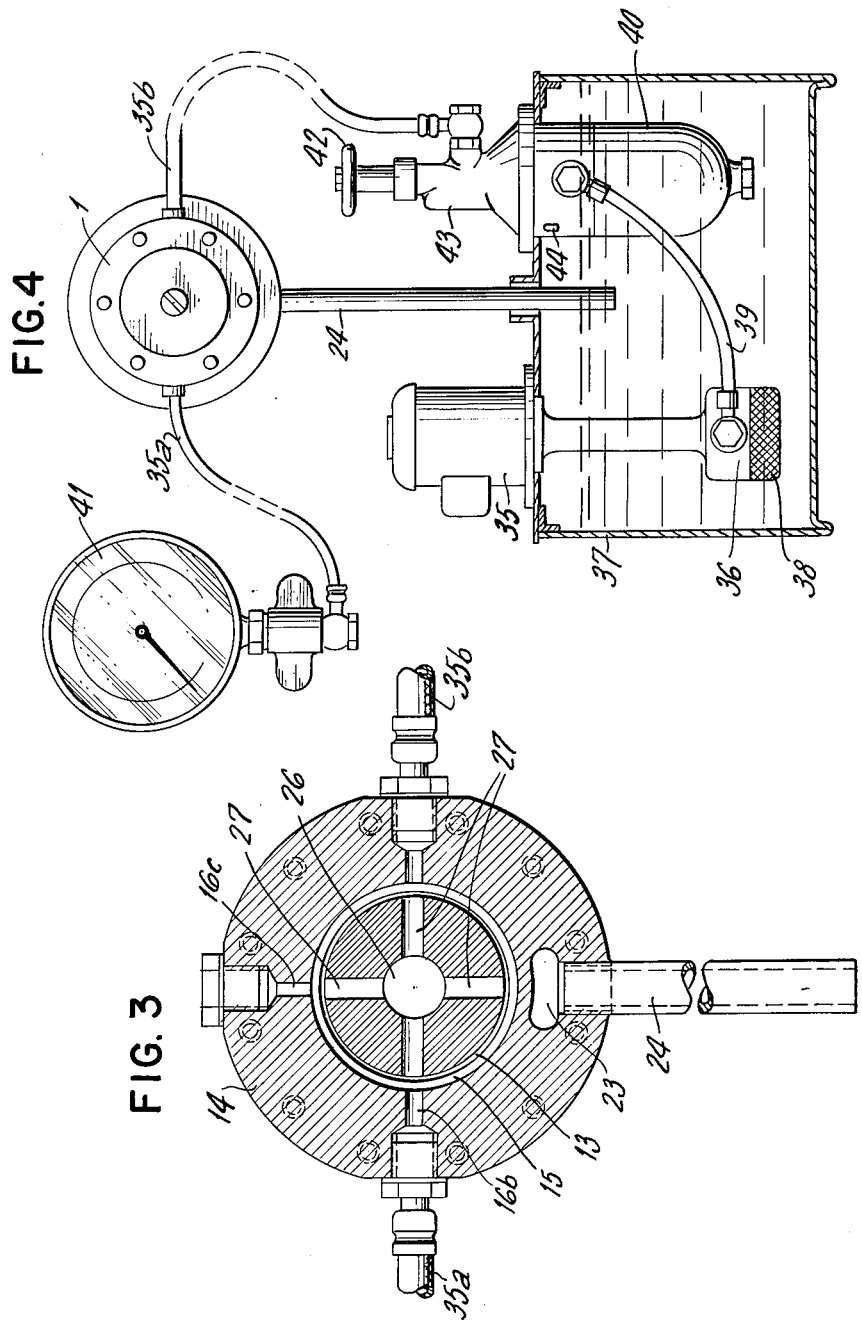

United States Patent Office 3,057,193
Patented Oct. 9, 1962

3,057,193
HYDROSTATIC TORQUE-MEASURING
APPARATUS
Georg Wiggermann, Kressbronn, Germany, assignor of one-half to Walter Reiners, M. Gladbach, Germany
Filed Dec. 2, 1957, Ser. No. 700,092
Claims priority, application Germany Dec. 3, 1956
12 Claims. (Cl. 73—136)

My invention relates to torque-measuring apparatus preferably suited for insertion into a drive-shaft line or other mechanical power transmission, and has for its main object to afford measuring the transmitted torque at any time independently of the rotating speed and sense of rotation, and to permit indicating the measured torque on a stationary instrument of the indicating or diagram-recording type. Another object, subsidiary to those mentioned, is to provide hydrostatic torque-measuring apparatus particularly suitable for transmitting the measured results to a remote location.

To achieve these objects, and in accordance with my invention, I provide a torque-transmitting coupling device, adapted to be interposed in a mechanical power transmission, with two coaxially rotatable structures which are connected to the input and output side respectively of the coupling device and are capable of slight angular displacement, substantially free of friction, relative to each other, such displacement being counteracted by hydrostatic cushions continuously maintained by a supply of oil or other liquid pressure medium, which produces within the cushions, and thus also in hydraulic ducts connected thereto, a pressure magnitude which is indicative of the torque to be measured and acts upon a pressure-sensing instrument preferably calibrated in terms of torque.

According to another, more specific feature of my invention, the pressure medium required for the measuring operation, usually oil, is supplied from a stationary pressure source to a stationary transfer member in journalling engagement with the rotating hydrostatic coupling devices proper; and the pressure to be measured is applied to a stationary manometric instrument by means of a tap conduit hydraulically connected with the transfer member. As a result, the measuring values can be read off from a stationary instrument mounted either on the transfer member itself or connected therewith by an oil line, preferably of the flexible type. By virtue of the same stationary pressure-transfer member, the measured pressure can readily be transmitted through a pipe line to a remote indicating or recording device or, if desired, can readily be transformed into an electrical magnitude acting upon an indicating, recording or controlling device of the electrical type.

According to still another feature of my invention, the measuring accuracy of the torque-measuring device is made independent of the rotating speed with the aid of means essentially as follows. The passage of the pressure medium from the rotating portion of the hydrostatic device onto the above-mentioned stationary transfer member is effected through a glide bearing, and the pressure medium leaving the hydrostatic coupling device is returned to the pressure source through a tubular neck which is coaxially spaced from the just-mentioned glide bearing and has an inner diameter equal to the running diameter of the glide bearing. As a result, the sum of all pressures caused by centrifugal force in the rotating system and in the oil lines and superimposing themselves upon the static measuring pressure, is made equal to zero, so that the centrifugal-force dependent pressures do not affect the desired response to the static pressure to be determined.

It is desirable to provide for linear proportionality of the measured pressure relative to the corresponding torque to be determined, so that the indicating or recording instrument may consist of a conventional manometer and may be given a single graduated scale calibrated in atmospheres or other units of pressure as well as in mkg. cmkg., or other units or torque. According to a further feature of my invention, therefore, the active area of the oil cushions as well as their number and spacing from the axis of rotation are so chosen as to secure the desired coincidence of the scale values, or the desired integral ratio between torque and measured pressure.

According to a further feature of the invention, the above-mentioned oil cushions are designed as variable-volume chambers, and one-half of the total number of these chambers is made effective in one direction of rotation whereas the other one-half of the total number of chambers is made effective in the other direction of rotation. For this purpose, the supply and discharge of the pressure medium relative to the individual variable-volume chambers is subjected to suitable control devices. As a result, the torque measurement is made independent of the direction of rotation of the transmission components and thus independent of the sense of the torque being measured.

The foregoing and more specific objects, advantages and features of my invention will be apparent from, and will be mentioned in, the following description of the embodiment illustrated on the drawings, in which—

FIG. 1 is a partly sectional view of a torque-measuring device according to the invention to be connected by means of flanges into a line of power-transmitting shafts.

FIG. 2 is a sectional, axial view of the same device.

FIG. 3 is a sectional view along the line III—III indicated in FIG. 1.

FIG. 4 is a schematic illustration of a complete measuring apparatus comprising a device shown in FIGS. 1 to 3.

In all illustrations, the same reference characters are used for the same components respectively.

The device illustrated in FIGS. 1 to 3 is essentially a torque-transmitting coupling which has a power input flange 1a and an output flange 5a for insertion between a driving shaft and a driven shaft respectively. The device serves to measure the torque transmitted to the flange 5a and hence to the shaft or rotating equipment connected to the latter flange.

The input flange 1a is rigidly joined with, or forms an integral portion of, a shaft 1 to which a claw ring 3 is secured by means of a key 2 inserted into a keyway of shaft 1. The claw ring 3 is enclosed within a rotating housing formed of an exterior claw ring 4 and two cover discs 5 and 6 firmly secured to claw ring 4 by screw bolts 11. The composite housing structure is journalled on shaft 1 by means of ball bearings 7 so as to be rotatable relative to shaft 1 substantially without friction. The above-mentioned power-output flange 5a is joined or integral with cover 5 and hence forms part of the rotatable housing structure.

The inwardly directed claw projection 8 of the outer ring 4 and the outwardly directed claw projections 9 of the inner ring 3 form together a number of variable-volume chambers 10a, 10b (FIG. 2) located in the interstices between claw rings 3 and 4. These chambers are closed on both axial sides by the cover discs 5 and 6. The inner claw ring 3 has slight diametrical and axial clearance and is so guided by the ball bearings 7 that it forms a good oil seal together with the cover discs 5 and 6 while still being rotatable within the outer claw ring 4 substantially without friction.

The shaft 1 forms a cylindrical glide-bearing surface 12 in the vicinity of the flange 1a. A ring-shaped transfer member 14 is rotatably seated on the bearing surface 12, a cylindrical lining 13 being interposed between shaft surface 12 and transfer member 14 (FIGS. 1, 3).

The transfer member 14 has a peripheral groove 15 adjacent to the bearing surface 12 and has several radial connecting ducts 16a, 16b, 16c (FIGS. 1, 3) which communicate with the annular groove 15 and have their respective outer ends provided with a screw thread. Two oil-catching covers 17a, 17b have respective flanges firmly secured to the transfer ring 14 by screw bolts (not illustrated). The transfer member 14 and the covers 17a, 17b joined therewith are held in proper axial relation to shaft 1 by means of a spring ring 19 inserted into a peripheral groove of shaft 1, and by a shoulder 20 of the shaft.

The cover disc 6 has a tubular neck 21 directed toward the transfer member 14 and surrounding the shaft 1 with radial clearance. The inner diameter $d_1$ of the neck 21 is equal to the diameter $d_2$ of the glide bearing within the transfer member 14. The neck 21 and the shaft 1 are provided with concentric grooves 22; and the two oil-catching covers 17a and 17b are provided with mating grooves 22 which together with the corresponding grooves of neck 21 and shaft 1 form respective labyrinth seals to prevent escape of the oil from the interior of the device.

The annular oil spaces formed by each pair of adjoining grooves 22 communicate with a hollow 23 in the transfer member 14, such communication being formed by connecting grooves milled into the annular ridges between the grooves 22. From the oil-collecting hollow 23, the oil can drain off without pressure through a drain pipe 24 that extends vertically downward from the transfer member 14. At the sealing locations of the above-mentioned labyrinth seals, the oil catchers 17a and 17b have sufficient radial clearance to avoid any friction due to relative rotation between the transfer member and the shaft.

The shaft 1 has a longitudinal center bore 26 closed by a screw plug 25 and in continuous communication through four radial bores 27 (FIGS. 1, 3) with the ring-shaped groove 15 of the transfer member 14. The shaft 1 and the claw ring 3, press-fitted upon the shaft 1, are provided with four additional radial bores 28 which extend through the claw projections 9 and have port openings at the periphery covered by the outer claw ring 4. The ports of bores 28 are each enlarged in the tangential direction by milled-in recesses 29. The outer claw ring 4 is provided with two recesses 30a, 30b between each two of its claws. The recesses 30a, 30b have such a position that when the claws 9 are in the illustrated neutral mid-position, each bore 28 communicates through its enlarged port 29 simultaneously with the two adjacent recesses 30a, 30b and thus also with the two adjacent variable-volume chambers 10a and 10b. The claw ring 3 possesses, in the range of the claws 8, four control bores 31a, 31b which, in the illustrated mid-position of the claws (FIG. 2), connect the variable-volume chambers 10a, 10b with two ring-shaped spaces 32 machined into the respective axially opposite sides of the claw member 3. The two spaces 32 communicate with each other through bores 33 (FIGS. 1, 2).

The connecting bores 16a, 16b and 16c of the transfer member 14 serve for supplying the pressure medium, preferably oil. They also serve for the connection of a manometer and, if desired, also of an electric pressure-sensing member or pick-up, as indicated at 34 in FIG. 1. All connecting conduits leading from transfer member 14 to stationary components of the measuring apparatus are preferably designed as flexible tubing in order to avoid clamping. Such flexible tubing is shown at 35a and 35b in FIGS. 3 and 4. The drain pipe 24, extending downwardly, operates also as a stop which prevents the transfer member 14 from rotating due to any friction occurring at its gliding seat on shaft 1. The weight of the drain pipe 24, and if necessary its abutments against a fixed object, are sufficient for this purpose.

FIG. 4 illustrates the entire torque-measuring apparatus including all necessary auxiliaries. An electric motor 35 drives a hydrostatic pump, for instance a spur-gear type pump 36, which inducts oil from an oil storage container 37 through a strainer 38. The pump forces the oil through a line 39 to an oil-inlet filter 40 and thence through the above-mentioned flexible tubing 35b to the transfer member 14 of the shaft-coupling device described above with reference to FIGS. 1 to 3. Another flexible tube 35a connects the transfer member 14 with a stationary precision manometer 41 whose indicating scale is preferably calibrated in atmospheres of the measured pressure and also in values of torque corresponding to the pressure. The scale may have a linear scale division.

Mounted on top of the oil filter 40 is a pressure limit valve 43 which is hydraulically parallel-connected to the line 35b and is adjustable by means of a hand wheel 42. The valve 43 is adjusted to the maximum oil pressure permissible for the particular manometer 41 being used. When this pressure is exceeded, as may occur during peak values of torque, the valve acts to limit the pressure to the desired value by permitting the excess oil to escape through an opening 44 back into the container 37.

The operation of the apparatus is as follows.

As mentioned, the coupling device described with reference to FIGS. 1 to 3 is flanged into the power-transmitting line of equipment so that the equipment portion whose torque is to be measured is connected with the flange 5a and thus also with the housing structure that comprises the outer claw ring 4, whereas the flange 1a of shaft 1 is connected with the driving portion of the transmission. By virtue of this connection, the torque to be measured cannot be falsified by any appreciable amount of friction since any gliding friction that may occur at the journal seat of the transfer member 14 is taken up by the driving portion of the transmission whose torque is not of interest.

The measuring performance is started by putting the gear pump 36 in operation. Oil from pump 36 is supplied under pressure through the transfer member 14 into the center bore 26 of shaft 1 and thence through the radial bores 28, the enlarged ports 29 and the recesses 30a, 30b into the variable-volume chambers 10a, 10b, assuming that the claws occupy the neutral mid-position shown in FIG. 2. At this time, the control bores 31a, 31b are open so that the oil can immediately escape, with minimum flow resistance, through bores 31a, 31b to the milled-in ring chambers 32 of the claw ring 3. From chambers 32, the oil flows through the left-hand ball bearing 7 (FIG. 1) and the annular gap between the tubular neck 21 of cover 6 and the shaft 1 toward the oil catcher 17b, whence the oil passes through the hollow 23 of transfer member 14 and drain pipe 24 back into the oil storage container 37 (FIG. 4). The quantitative delivery of the gear pump 36 is to a large extent independent of the counterpressure and is so rated that the oil, after entering into the annular groove 15 of transfer member 14, does not encounter appreciable resistance on its further path through the measuring equipment. Hence, under the above-mentioned conditions, the manometer 41 does not indicate pressure.

However, when a counterclockwise torque occurs in shaft 1, the inner claw ring 3 (FIG. 2) has the tendency to become angularly displaced in the clockwise direction relative to the surrounding claw ring 4. This has the consequence that the enlarged ports 29 of the bores 28 are no longer in communication with the recesses 30a but become open toward the recesses 30b to a greater extent than before. The same angular displacement causes the variable-volume chambers 10b to become diminished until the escape of oil is subjected to throttling at the control bores 31b by the action of the claws 8. This is accompanied by a pressure increase in the variable-volume chambers 10b. However, as soon as the oil pressure in these chambers forces the claw pairs 8, 9 tangentially so far apart from each other that a state of equilibrium with the transmitted torque occurs, the relative rotation is automatically terminated due to the fact that any further relative rotation would have a still greater throttling effect upon the passage of oil so that the resulting pressure in the variable-volume chambers 10b and hence the corresponding separating torque between the claw pairs 8, 9 would exceed the driving torque and cause a reverse relative rotation between the inner claw ring 3 and the outer claw ring 4. Consequently, the above-described performance is inherently a self-regulating operation by virtue of which a corresponding relative rotation and the accompanying throttling of the oil passage out of the chambers 10b always builds up in these chambers an oil pressure directly proportional to the transmitted torque. During the above-described regulating operation, the variable-volume chambers 10a were separated from the oil supply and, instead, the corresponding control bores 31a were more greatly opened to effect oil circulation. Consequently, the variable-volume chambers 10a do not participate in, nor influence, the regulating and measuring operation.

When the transmitted torque reverses from counter-clockwise to clockwise, which may occur during operation, for instance, due to an overhauling load, then the resulting relative rotation of claw rings 3 and 4 is in the reverse direction. This has the effect that the supply of oil under pressure to the variable-volume chambers 10b is terminated and that instead the supply is further opened relative to the chambers 10a. At the same time, the control bores 31b open and the control bores 31a become throttled to such an extent that the oil pressure in the variable-volume chambers 10a automatically regulates itself so as to counterbalance the transmitted torque. Now, the variable-volume chambers 10b have no pressure, so that the above-described regulating performance again takes place but now only in chambers 10a.

If the transmitted torque exceeeds the upper limit value determined by the pressure capacity of the manometer and set by means of the valve 43, the oil pressure and the variable volume of the chambers cannot increase beyond a certain value; and the relative rotation may then progress until the claws 9 of the inner ring 3 touch the claws 8 of the outer ring 4, thus forming a rigid claw-type clutch. However, the particular one-half of the number of variable-volume chambers then active remain in communication with the correlated bores 28. Consequently, as soon as the excessive torque declines back to the permissible measuring range, the above-described regulating operation is immediately and automatically resumed.

To avoid overstressing the measuring device, it is not desirable that the claw pairs 8, 9 will vigorously hit upon each other in the event of overloading. For that reason, the variable-volume chambers 10a, 10b and the control bores 31a, 31b are so adapted to each other, as regards shape and position, that shortly before the respective claws can touch each other, the diminishing variable-volume chambers are completely separated from the control bores 31a or 31b, and are partly separated by throttling from the recesses 30a or 30b at least to such an extent that the excessive torque causes the formation of a pressure-oil cushion temporarily effective to prevent hard bouncing of claws 8 and 9 on each other.

The regulated oil pressure built-up in the variable-volume chambers active at any one time, transmits itself to the annular groove 15 of the transfer member 14, and this pressure acts through flexible line 35a upon the manometer 41 where this pressure is indicated. Since the structural dimensions of all active components that form the variable-volume chambers are fixed, the manometer deflection is also proportional to the transmitted torque which is likewise indicated by the instrument. It is preferable to have the oil pressure and the corresponding torque, measured in respectively different units of measurement, indicated by the same numerical values or by numerical values that differ from each other by an integral factor. This can readily be obtained by properly adapting the size of the engagement surfaces of the claws, to be looked upon as piston surfaces, relative to the distance of the gravity center of these surfaces from the axis of rotation, and also to the number of the variable-volume chambers that are hydraulically connected in parallel at any one time. Furthermore, since change ($\Delta V$) in the volume (V) of the variable-volume chambers takes place in linear proportion to the angular amount ($\phi$) of relative rotation that causes this change in volume (according to the equation $\Delta V/\Delta \phi = K$, wherein K is a constant), the use of a customary manometer and recording device of uniform, linear scale division is readily and very advantageously possible.

The viscosity of the oil does not affect the measuring accuracy. This is because the resistance caused by the viscosity between the mutually gliding surfaces of the variable-volume chambers, having only slight clearance from each other, is independent of the displacement velocity and always tends, also independently of the viscosity, to approach the zero value together with the displacement velocity. In practice, the final measuring value adjusts itself with some asymptotic delay. However, due to the slight travel of the rotary relative displacement, such delay is negligible in most cases. When torque fluctuations of high frequency occur, the pressure in the variable-volume chambers adjusts itself to a median value, and the manometer accordingly indicates the effective median torque.

However, the torque-measuring device according to the invention is also suitable for response to torque variations of higher frequency by connecting a suitable pressure-sensing device or pick-up directly with a connecting duct of the transfer member 14, such a pressure-sensing member being shown at 34 in FIG. 1. The pressure pick-up may consist of any of the commercially available types such as an electro-magnetic, piezoelectric, or resistance strain gauge, these pick-ups being generally dependent upon electro-physical effects. In this manner, the displacement volume required for attaining pressure balance upon occurrence of a change in torque is reduced to a minimum with the consequence that the adjusting delay of the indication is correspondingly reduced.

In principle, the torque-measuring device may be fed with oil from any desired pressure source. For instance, the oil may be supplied from the lubricant circulation system of a drive motor. In this case, it is only necessary to insert an adjustable throttle into the line for supplying the pressure oil to the transfer member. By means of such a throttle, the oil current, even when the torque is a minimum or zero, is limited to a flow quantity which does not form an appreciable resistance or pressure increase in the oil bores of the measuring system.

If the oil supply line for passing the oil under pressure to the transfer member 14 is given a large cross section relative to the quantity of oil delivery, then the manometer or other pressure-sensing device may be directly connected to this supply line, for instance to line 35b in FIG. 4, thus making it unnecessary to use the oil line 35a. The above-described equality of the diameters $d_1$ and $d_2$ of the tubular neck 21 and of the glide bearing of transfer member 14 completely compensates the effect of centrifugal force acting upon the columns of liquid rotating in the measuring system and varying in dependence upon the speed of rotation. As a result, the influence of the rotating speed is eliminated. The underlying principle may also be expressed by stating that the entrance of the pressure medium from the stationary portion into the rotating portion, and the exit of the medium from the rotating portion into the stationary portion or to the exterior, must both take place on the same radius of the rotating portion of the measuring device.

It is preferable, as shown in FIG. 4, to structurally combine the oil storage container, the hydrostatic pump and its drive, the oil filter and the pressure limit valve, if desired also the manometer or other indicating instrument, so that these components form a single structural unit. These components, with the exception of the oil storage container proper, are preferably mounted on, or attached to, the top cover of the oil container. The entire unit can then be removed from the container proper simply by lifting the cover and the parts mounted thereon, thus making the container easily accessible for cleaning of the filter 40 and of the strainer 38.

As mentioned above, a slight clearance is provided between the relatively displaceable surfaces that define the variable-volume chambers, such clearance being desired for avoiding the occurrence of appreciable friction that may affect the accuracy of measurement. The provision of such slight clearance, however, has no detrimental effect upon the measurements because the resulting leakage oil is continuously replenished in the variable-volume chambers without pressure drop from bores 28.

The herein-illustrated and above-described embodiment of a measuring device according to the invention, shown in FIGS. 1 to 4, has been chosen for the purpose of disclosure because it clearly exhibits the essential features of my invention. However, it is obvious that such devices according to the invention permit of various modifications. For example, the radial bores 28, without affecting the desired operation, may communicate through a transverse bore with both radial sides of each of the respective claws; and the recesses 30a, 30b may be machined into the covers 5, 6. This applies analogously to the control bores 31a, 31b. It is likewise not absolutely necessary to insert the measuring device on both sides with the aid of a flange into the torque transmission system. For example, the rotating housing comprising the outer claw ring 4 may be formed as a fixed component of a driving or driven spur gear, belt sheave, or other rotating machine component.

By virtue of the above-described properties of the novel torque-measuring device according to the invention, such a device can perform most of the measuring operations heretofore dependent upon the use of complicated and more expensive special apparatus of electrical type. Aside from the reduced cost of a device according to the invention, it also affords the advantage that, by virtue of its simplicity, is extremely insensitive, easy to service, and poses no difficult maintenance requirements so that no personnel of special skill is needed. Another advantage over the known electrical torque-measuring means is the fact that, as long as the device does not suffer mechanical damage, its calibration, once adjusted, remains effective and accurate for a virtually unlimited period of time.

I claim:

1. A hydrostatic torque-measuring apparatus, comprising a torque transmission device having a rotatable driving structure and a coaxially rotatable driven structure capable of limited angular displacement relative to each other, said two structures forming together a plurality of inter-spacial chambers having variable volume dependent upon said displacement, a hydraulic pressure source, pressure duct means connecting said source with said chambers for supplying hydraulic medium to said chambers, drain duct means for discharging hydraulic medium from said chambers, control port means formed by said two structures and connecting all said chambers with said drain duct means when said two structures are in neutral mid-position relative to each other, said port means having variable port areas dependent upon said relative displacement to increasingly shut off said drain duct means from those of said chambers that decrease their volume due to any occurrence of said displacement whereby the pressure in said latter chambers increases in dependence upon the torque being transmitted, and stationary pressure-sensing means connected with said chambers for response to said pressure to measure said torque, said two rotatable structures having respective claw members inter-engaging each other concentrically and having peripheral clearance to form said variable-volume chambers, and said control port means being fully closed so as to completely seal said chambers of decreasing volume before said claw members, in the event of excessive relative displacement of said two structures, can directly touch each other.

2. A hydrostatic torque-measuring device capable of being inserted as a coupling between a driving and driven shaft, comprising a rotary housing having inwardly projecting claw members and provided with an anti-friction bearing, a rotatable body coaxially journalled in said anti-friction bearing and having outwardly projecting claw members engageable between said inwardly projecting claw members of said housing, said housing and said rotatable body being capable of limited angular displacement relative to each other and forming between said respective claw members a plurality of inter-spacial chambers having variable volume dependent upon said displacement, a hydraulic medium filling said chambers, said chambers continuously providing a fluid cushion opposing relative rotation of said housing and body, tubular neck means forming a part of said housing and surrounding a portion of said rotary body with diametral interspace clearance therebetween, a ring-shaped stationary transfer member in coaxial journalling engagement with said rotatable body and having an annular groove on its inner periphery and a hollow separate from said groove, said transfer member being provided with a hydraulic medium retaining cover surrounding said tubular neck means, a hydraulic pressure source, pressure duct means connecting said source through said groove with said chambers for supplying hydraulic medium to said chambers, drain duct means for discharging hydraulic medium from said chambers, port means within said pressure duct means and having variable port areas dependent upon said relative displacement whereby the pressure in said chambers varies with the chamber volume in dependence upon the torque being transmitted, said drain duct means forming a flow path for hydraulic pressure medium discharged from said variable volume chambers through said anti-friction bearing means and through said diametral interspace to said medium retaining cover to said hollow and out through said drain duct means, and stationary pressure-sensing means connected with said chambers for response to said pressure to measure said torque.

3. In a hydrostatic torque-measuring apparatus according to claim 2, said rotatable body comprising a central shaft having a glide-bearing surface which forms said journalling engagement with said transfer member, said groove of said transfer member being located around said bearing surface, the internal diameter of said tubular neck means being approximately equal to the effective journalling diameter of said glide-bearing surface.

4. Hydrostatic torque-measuring apparatus according to claim 2, said rotatable body comprising a central shaft having a glide-bearing surface which forms said journalling engagement with said transfer member, said annular groove of said transfer member being located around said bearing surface, a second hydraulic medium retaining cover located on the axially opposite side of said transfer member, said two retaining covers respectively surrounding portions of said tubular neck and said rotary body with a slight radial clearance to avoid frictional contact, and mating grooved means forming a labyrinth seal between said tubular neck means and said central shaft for preventing escape of hydraulic medium from the interior of the device.

5. Hydrostatic torque measuring apparatus according to claim 4, said two retaining covers being located on the opposed frontal faces of said transfer member, said drain duct means including a drain tube radially connected downwardly from said hollow of said transfer member, said control port means being formed by said housing and said rotatable body and connecting all said chambers with said drain duct means when said housing and body are in neutral mid-position relative to each other, said port means having variable port areas dependent upon said relative displacement to increasingly shut off said drain duct means from those of said chambers that decrease their volume due to any occurrence of said displacement whereby the pressure in said latter chambers increases in dependence upon the torque being transmitted, at least one of said retaining covers forming part of said drain duct means, said drain duct means being arranged to lead the hydraulic medium discharged from said chambers through said control port means through said one retaining cover to said hollow of said transfer member and thence to said radial downwardly directed drain tube.

6. Hydrostatic torque measuring apparatus according to claim 1, further defined in that the axial cross sections of said variable volume chambers, the radial distance of the area center of gravity of said axial cross sections from the axis of rotation of said housing, and the number of said chambers are correlated in such a manner that a proportion capable of being expressed in integers is established between the pressure in said chambers and the prevailing torque between said housing and body, said pressure sensing means comprising a pressure-sensing instrument having first scale divisions indicative of linear units of atmospheres gauge pressure and second scale divisions indicative of linear units of torque, said instrument having an indicating pointer common to said two scale divisions.

7. In a hydrostatic torque-measuring apparatus according to claim 2, said pressure duct means including a substantially radial bore formed in said transfer member and flexible conduit means hydraulically connecting said radial bore with said pressure-sensing means.

8. In a hydrostatic torque-measuring apparatus according to claim 7, said hydraulic pressure source comprising a hydraulic pump, said pressure duct means including a second substantially radial bore formed in said transfer member and second flexible conduit means hydraulically connecting said second radial bore with said pump, the output capacity of said pump within the range of pressure to be measured being so dimensioned that negligible resistance to flow is offered by the effective flow cross sections of the portions of said pressure duct means and drain duct means subsequent to said transfer member, whereby in said neutral mid-position of said structures said pressure-sensing means indicates a zero pressure.

9. A hydrostatic torque-measuring device according to claim 1, further defined in that the pressure from said pressure source is higher than the highest pressure within the range of pressures to be measured by said device, and an adjustable throttle valve connected between said pressure source and said chambers for reducing the flow of medium to the requisite amount corresponding to said range of pressures.

10. A hydrostatic torque-measuring device according to claim 1, said pressure source comprising an oil reservoir, a pump connecting said reservoir with said variable volume chambers, an adjustable overflow pressure limit valve interposed in said pressure duct means between said pump and said chambers for diverting the oil flow out of said pressure duct means before a predetermined gauge pressure and torque limit are exceeded, said drain duct means being connected with said reservoir for circulating the oil from said chambers back to said reservoir.

11. A hydrostatic torque-measuring device according to claim 1, said pressure source comprising an oil reservoir, a pump connecting said reservoir with said variable volume chambers, a fine oil filter interposed between said reservoir and said pump, an adjustable overflow pressure limit valve interposed in said pressure duct means between said pump and said chambers for diverting the oil flow out of said pressure duct means before a predetermined gauge pressure and torque limit are exceeded, said drain duct means being connected with said reservoir for circulating the oil from said chambers back to said reservoir.

12. Device according to claim 11, said pump being provided with a drive, said pump and drive, together with said adjustable overflow valve, said pressure gauge and said reservoir being arranged together to form a unitary structure.

References Cited in the file of this patent
UNITED STATES PATENTS

| | | |
|---|---|---|
| 67,096 | Ashcroft | July 23, 1867 |
| 2,398,167 | Walker | Apr. 9, 1946 |
| 2,715,834 | Chamberlin | Aug. 23, 1955 |